United States Patent [19]

Lemelson

[11] Patent Number: 4,642,705
[45] Date of Patent: Feb. 10, 1987

[54] MAGNETIC RECORDING AND REPRODUCTION APPARATUS, SYSTEM AND METHOD

[76] Inventor: Jerome H. Lemelson, 48 Parkside Dr., Princeton, N.J. 08540

[21] Appl. No.: 815,933

[22] Filed: Jan. 3, 1986

Related U.S. Application Data

[63] Continuation-in-part of Ser. No. 405,996, Aug. 6, 1982, Pat. No. 4,578,717.

[51] Int. Cl.⁴ ................................................. G11B 5/00
[52] U.S. Cl. ........................................ 360/18; 360/21; 360/48; 360/55; 358/340
[58] Field of Search .................. 360/18, 21, 48, 55, 360/57, 58; 358/340, 343

[56] References Cited

U.S. PATENT DOCUMENTS

| | | | |
|---|---|---|---|
| 4,101,947 | 7/1978 | Lambeth | 358/312 |
| 4,131,912 | 12/1978 | Hirai | 358/312 |

*Primary Examiner*—Robert L. Richardson

[57] ABSTRACT

A system and method for effecting high density magnetic recordings on magnetic record members such as tape, cards, discs and drums coated with magnetic recoding material. A plurality of different recordings may be provided as overlapping domains or arrays of domains along a single select magnetic record track, thus doubling or additionally multiplying the total amount of information which may be recorded along each record track of a multiple track record member. In one form, one or more magnetic transducers mounted on a common support, may be pivotally driven to variably align their pole pieces and recording or reproduction gaps with a select record track of a record member to provide respective recordings, the domains of each of which are differently aligned from the domains of the others, permitting such different recordings to overlap along the same length of the same track and to be discretely detected by suitably aligned pickups. In another form, a plurality of differently aligned magnetic transducers are fixedly supported on a common substrate or head, each having a respective recording and/or reproduction gap which is angulated or azimuthed differently than the others and is located to scan the same record track of a magnetic record member for performing overlapping recordings and/or reproducing respective of such overlapping recordings from the same track. In a third form, two or more magnetic transducers are staggered but operable to transduce with respect to substantially the same record track.

20 Claims, 20 Drawing Figures

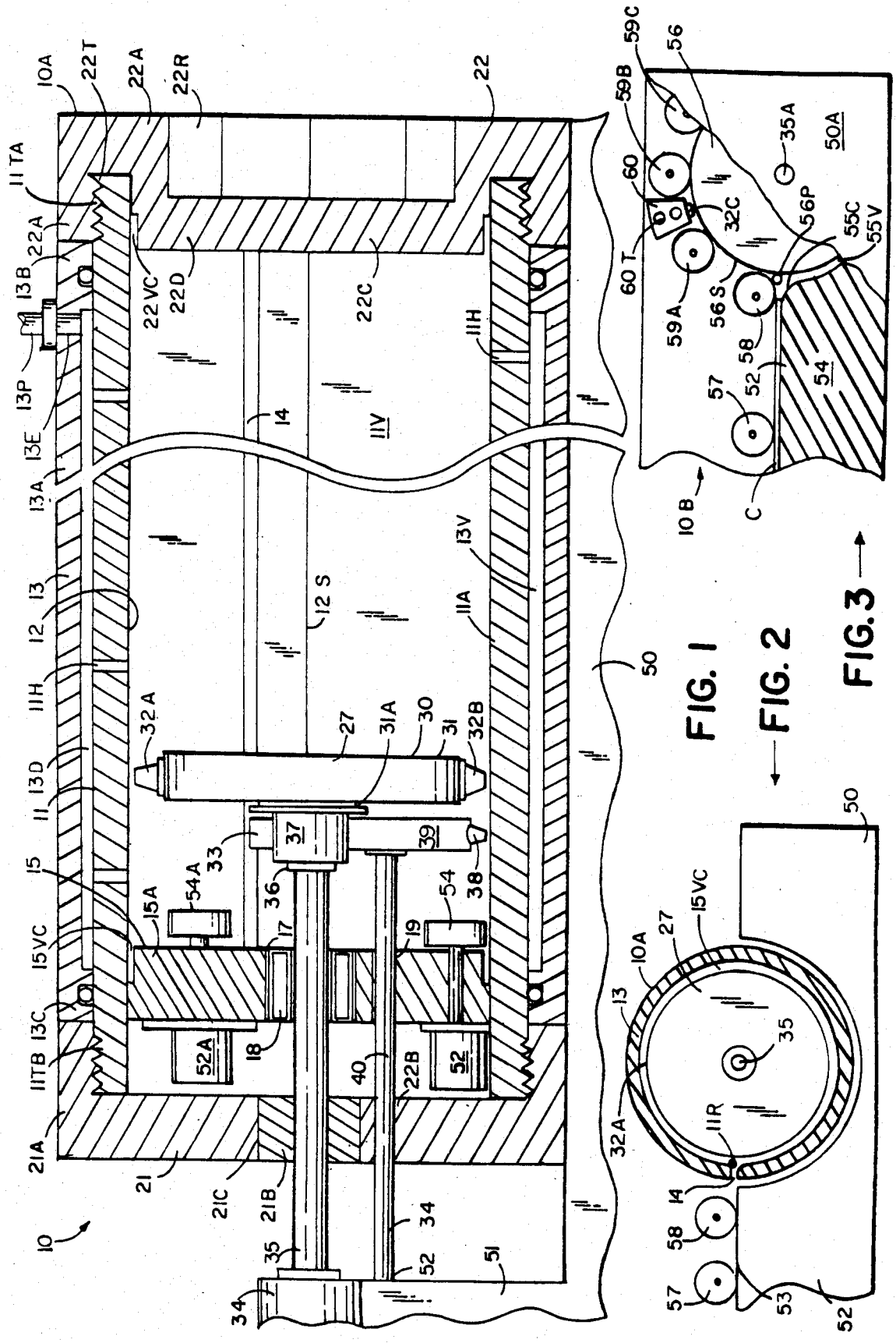

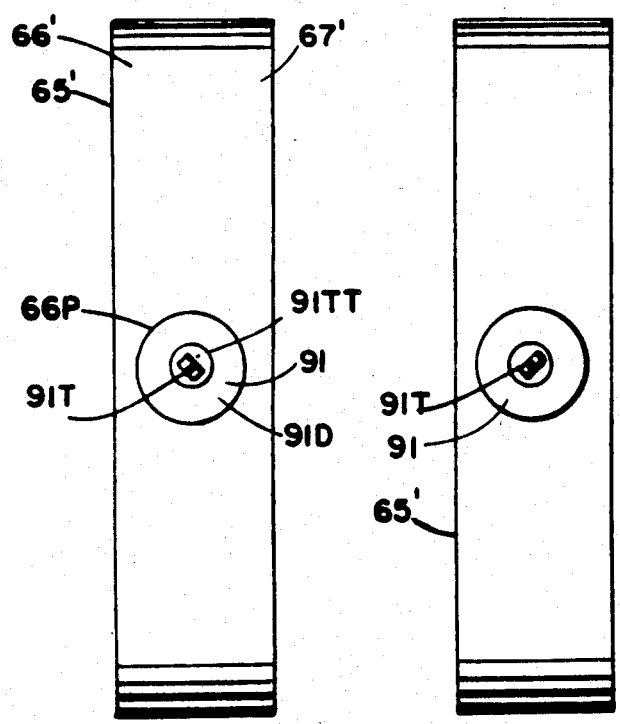
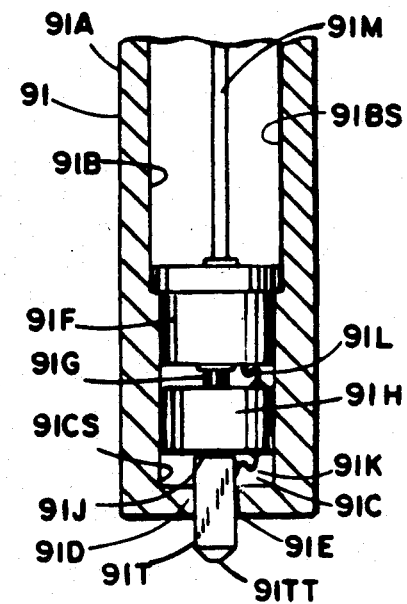
FIG. 6 FIG. 7 FIG. 8
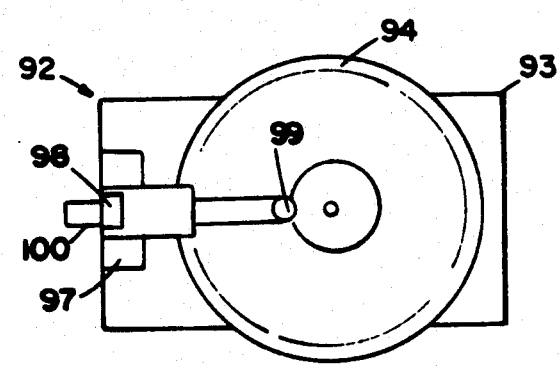
FIG. 9
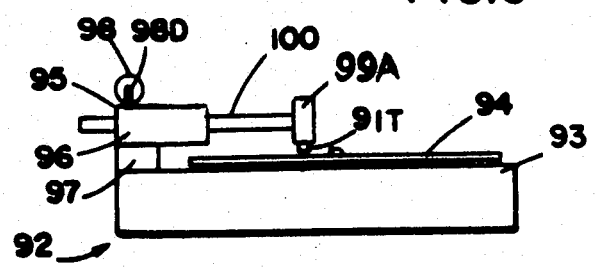
FIG. 10

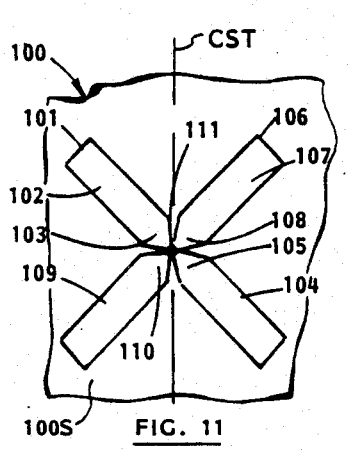
FIG. 11
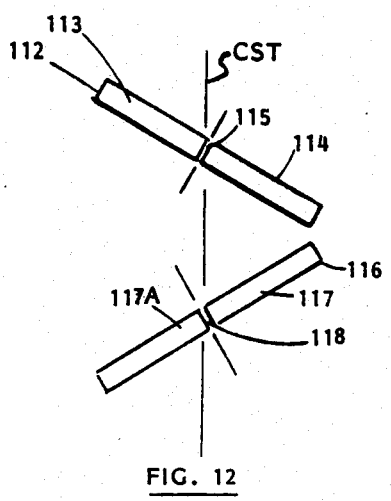
FIG. 12
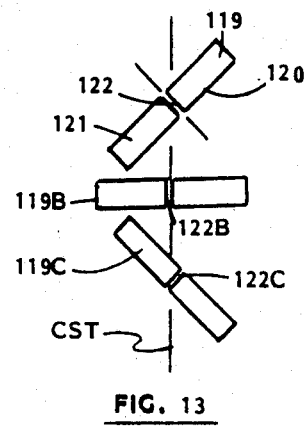
FIG. 13
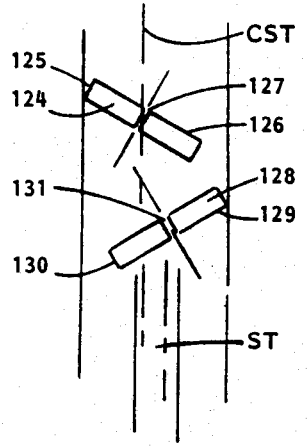
FIG. 14
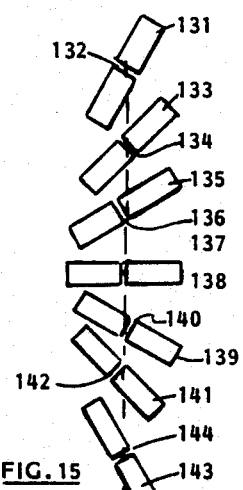
FIG. 15
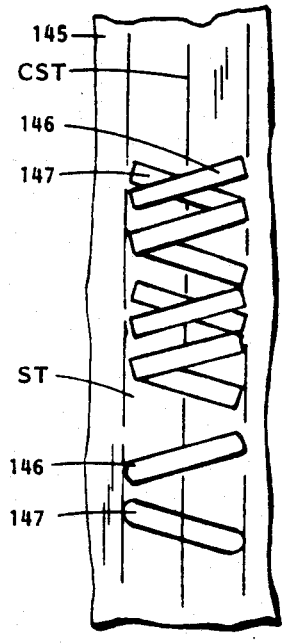
FIG. 16
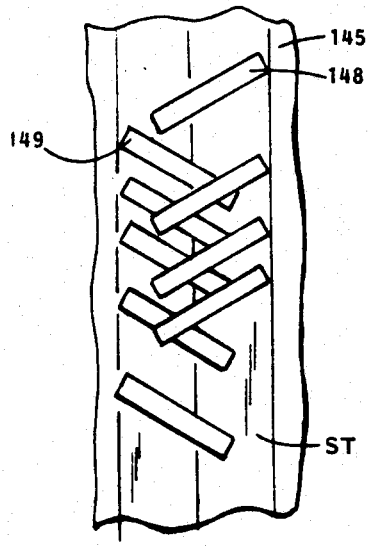
FIG. 17
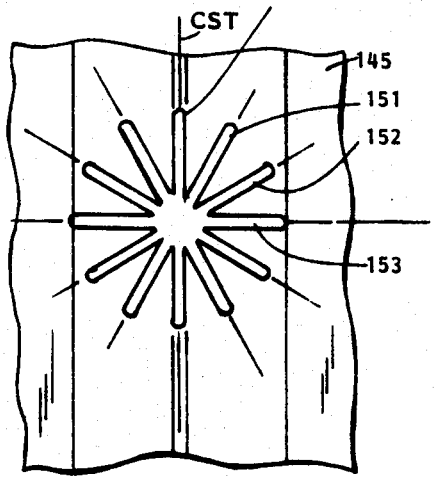
FIG. 18
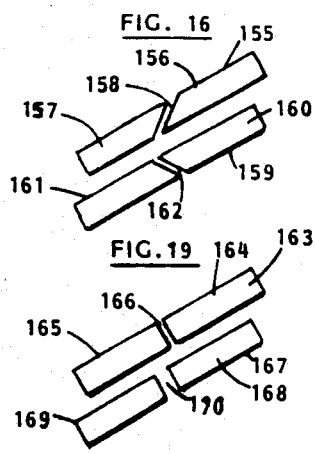
FIG. 19
FIG. 20

MAGNETIC RECORDING AND REPRODUCTION APPARATUS, SYSTEM AND METHOD

RELATED APPLICATIONS

This is a continuation-in-part of Ser. No. 405,996 filed Aug. 6, 1982 and now U.S. Pat. No. 4,578,717 for Magnetic Record Card Transducing Apparatus and Method.

SUMMARY OF THE INVENTION

This invention relates to an apparatus and method for transducing information with respect to selected tracks of a magnetic record card while the card is in a cylindrical or partial cylindrical configuration and the parallel tracks thereof are circularly configured. Rapid relative axial movement between the card and the transducing means is effected to attain a selected track so as to reduce access time.

It is known in the art to magnetically transduce with respect to parallel tracks of a magnetic record card, reference being made to my U.S. Pat. Nos. 3,434,130; 3,818,500; 3,803,350 and 3,943,563.

The instant invention provides improvements in the apparatus and methods of the prior art for effecting such transducing as the recording of signals defining selected information along selected tracks of a multiple parallel tracks magnetic record member. Improved access time and recording density are effected by the apparatus and methods disclosed herein so as to increase the versatility and applications of the system disclosed.

In my co-pending application Ser. No. 379,517 filed 5-18-82 improvements are provided in the structures and recording arrangements of magnetic record cards, such as flexible, "floppy" plastic records card or sheets coated with or containing magnetic recording material and it is intended to utilize such card structures and recording arrangements in the instant application wherein the cards are made to conform to a cylindrical or partial cylindrical support during a transducing operation and either the support is rotated at high speed or one or more transducers are rotated while magnetic coupling is effected between the transducing means and the cylindrically deformed card, particularly when a selected circular track thereof is in alignment with the transducing means, so as to effect a recording or reproduction operation with respect to either an entire circular track or a selected portion of a selected track of the card. Magnetic recordings of data are provided along selected tracks of the card which tracks are closely spaced, wherein recording densities of between 20,000 and 40,000 bits per inch may be achieved without difficulty employing conventional horizontal recording techniques. The instant invention provides means for substantially increasing such recording density by what is termed herein as "overlap-recording", a process in which two or more recordings of data, such as digital data, are provided along the same length of the same record track or along very closely spaced separate record tracks with very little, if any guard band areas therebetween, wherein each recording is composed of respective longitudinal arrays of singly aligned magnetic domains or groups thereof which overlap or are overlapped by the domains or domain groups of the other recording or recordings. By respectively angulating the magnetic recording transducers for each recording made thereby to provide the domains of each recording extending at a different angle with respect to the longitudinal axis of the record track than the angles of the other domains, even though the respective arrays of domains overlap each other, they may be separately detected by suitably aligned and angulated magnetic pick-ups or reproduction transducers, thus providing two or more different recordings along the same length of magnetic track.

Accordingly it is a primary object of this invention to provide new and improved magnetic recording apparatus and methods for recording two or more recordings along the same length of the same track of a magnetic record member.

Another object is to provide a magnetic recording system and method employing horizontal recording techniques wherein the recording density may be substantially increased by a factor of two or more.

Another object is to provide a magnetic recording system employing one or more magnetic transducers which may be controllably pivoted about their central axes to selectively align their field gaps for selectively recording different recordings defined by respective arrays of domains which are angulated differently than those of the other recordings.

Another object is to provide improvements in fixed head magnetic transducers capable of providing higher than normal density recordings in magnetic record members.

Another object is to provide improved methods for effecting high density magnetic recordings and improved recording arrangements allowing higher than normal recording densities with respect to record cards, discs and tape.

With the above and such other objects in view as may hereinafter more fully appear, the invention consists of the novel constructions, combinations and arrangements of parts as will be more fully described and illustrated in the accompanying drawings, but it is to be understood that changes, variations and modifications may be restored to which fall within the scope of the invention as claimed.

BRIEF DESCRIPTION OF THE DRAWINGS

FIG. 1 is a side view with parts broken away for clarity of a magnetic transducing apparatus employing a rotating transducing arrangement discposed withing a cylindrically deformed magnetic record card.

FIG. 2 is an end view with parts broken away of the apparatus of FIG. 1.

FIG. 3 is an end view with parts broken away of a modified form of magnetic card transducing apparatus.

FIG. 6 is a side view of a modified magnetic transducer assembly applicable to the apparatus of FIGS. 1 to 5 showing a transducer with its recording-reproduction gap disposed at a first attitude.

FIG. 7 is a side view of the transducer assembly of FIG. 7 with the transducer rotated to provide the azimuth of its gap at an angle to that of FIG. 6.

FIG. 8 is a side view with parts broken away for clarity of a transducer assembly of the type employed in FIGS. 6 and 7.

FIG. 9 is a plan view of a magnetic disc drive employing a pivotable transducer assembly of the type illustrated in FIG. 8.

FIG. 10 is a side view of the magnetic disc and drive assembly of FIG. 9.

FIG. 11 is a face or plan view of the gap containing end of a portion of a magnetic head assembly showing two magnetic transducer disposed at right angles to each other and operable to scan and transduce with respect to the same track of a magnetic record member.

FIG. 12 is a face view of the gap containing end of a portion of a magnetic head assembly showing two magnetic transducers, the recording gap of each of which transducers is azimuthed or angulated differently with respect to a single record track of a record member which such transducers simultaneously scan.

FIG. 13 is an end or face view of the gap containing end of a magnetic head assembly having three magnetic transducers which are closely spaced with their recording-reproduction gaps aligned to scan the same record track of a magnetic record member but each angulated differently from the others.

FIG. 14 is an end or face view of the gap containing end of a portion of a magnetic head assembly having two transducers which are offset or staggered with each having a different gap angle for providing magnetic recordings or domains which overlap along the same record track.

FIG. 15 is an end or face view of a magnetic head assembly having a plurality of aligned magneic transducers, each with a different gap azimuth for recording and reproducing a plurality of different digital recordings along the same length of the same record track of a magnetic record member.

FIG. 16 is a greatly magnified view of a portion of a magnetic record member showing a portion of a single record track thereof and magnetic domains defining pulse recordings of different information recorded along the same section of track wherein the domains of one recording have an azimuth or azimuths different from the domains of the other recording and wherein certain of the domains of one recording overlap respective domains of the other recording.

FIG. 17 is a view of a portion of a magnetic record member showing magnetic domains of one recording partially overlapping the domains of another recording along the same track area.

FIG. 18 is a face view of a magnetic recording at a select location of a magnetic record member which recording is formed of four magnetic domains, each at an azimuth or longitudinal angle with is different from that of the others a degree such that each may be separately detected.

FIG. 19 is an end or face view of a portion of a magnetic head assembly showing two closely spaced magnetic transducers with pole gaps constructed to provide recordings in the form of magnetic domains which are differently aligned as a result of differently orienting such pole gaps.

FIG. 20 is a face view of a portion of a magnetic head having two closely spaced magnetic transducers, one for recording and the other for reproducing digital magnetic signals and applicable to the transducer arrangements illustrated in others of the drawings.

In FIGS. 1 and 2 there is shown details of a first form of the invention defining a magnetic card transducing apparatus for performing either or both of the functions of selectively recording information along selected record tracks of a magnetic record card and/or selectively reproducing information recorded along selected record tracks of a similar card while such card is arcuately deformed and disposed within a cylindrical bore or chamber of a housing containing a rotatable magnetic transducer or a number of such transducers adapted to be power rotated about the longitudinal axis of the cylindrical bore against which the card is arcuately deformed.

Figures 4, 5:
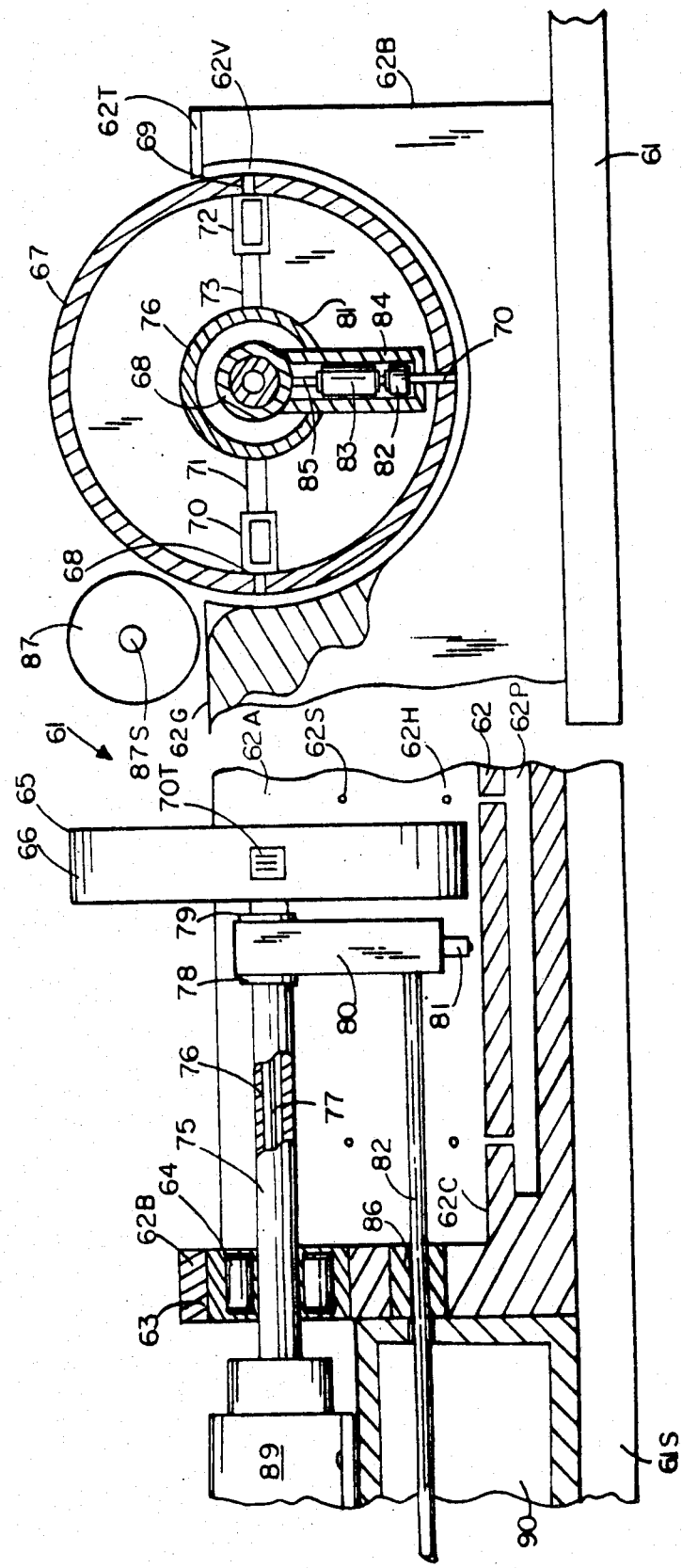
FIG. 4 is a side view with parts broken away for clarity of another modified form of the invention employing means for deforming a magnetic record member in the configuration of a semicylinder.
FIG. 5 is an end view of FIG. 4 with parts broken away.

The electromechanical assembly 10 includes a housing 11 supported on a base 50 which also supports a rotary and axial drive for a shaft 35, at the end of which is supported a disc-shaped housing 27 within the cylindrical volume or bore 11V defined by housing 11. Surrounding and secured to the exterior surface of housing 11 is a second cylindrical housing or jacket 13 containing a cylindrical cavity or recess portion 13D defined by the central portion 13A of the wall of jacket 13 and supported a distance away from the central portion 11A of housing 11, thereby providing a volume 13V between jacket 13 and wall 11, which volume may be evacuated of air when a record card is disposed arcuately deformed within housing 11 adjacent the interior surface 12 thereof. Such vacuum may be effected by means of a suitable source of vacuum pressure, such as a vacuum pump or vacuum chamber connected through a tube 13P to a radial passageway 13E extending through wall portion 13A wherein the negative pressure is applied at a selected time during an operating cycle so as to cause the flexible magnetic card to abut and conform to the shape of the cylindrical inside surface 12.

Secured to and closing off the ends of housing 11 are respective cup-shaped closures 21 and 22. Closure 21 has a cylindrical side wall 21A which is internally threaded to engage threads 11TB formed at the end of housing 11. A lineal bearing or bushing 21B is retained within a central cylindrical opening or bore 21C in the end wall 21 and the bearing supports shaft 35 for rotational and lineal movement therein. Shaft 35 is supported by an upward extension 51 of the supporting base 50 which also supports a table portion 52 containing an upper surface 53 extending to one side of the housing 11, preferably in a plane which passes through the axis of rotation of shaft 35 to permit a record card to be driven along surface 53 by powered rollers 57 and 58 disposed above surface 53 and supported by table 52 when an elongated slotted opening 14 extending through the side wall of housing 11 and jacket 13, is aligned with the upper surface 53 of table 52 as illustrated in FIG. 2. An elongated rod 11R located just inside housing 11 and extending between the end walls thereof guides the flexible record card in a downwardly direction, together with auxiliary guide means to be described, against the inside surface 12 before suction is applied to draw such card against said surface.

Closure 22 at the other end of housing 11 has its cylindrical side wall 22A internally threaded with threads 22T adapted to engage threads 11TA formed in the outer surface at the other end of housing 11. The central portion of end wall 22B of the closure 22 contains a recess or cavity 22R defined by a side wall which is shaped to permit a suitable tool or wrench to be inserted therein and to grip the flat side wall portions thereof to permit the closure to be turned and tightened against the end of the cylindrical housing 11 as illustrated. Notation 22C refers to a central portion of closure 22 which is thus inserted into the interior volume 11V of housing 11 and which contains an inwardly stepped portion 22D which provides an annular cylindrical volume 22VC with the adjacent inside cylindrical surface of the side wall 11, which volume serves to guide the end of the flexible magnetic record card after it is inserted through opening 14, into close proximity with the inside cylindrical surface 12 while the other end of the flexible record card is similarly guided by an annular cylindrical volume 15VC formed in a stepped portion of an disc-shaped support 15 which is secured within housing 11 by means of one or more threaded fasteners retaining it against the inside surface 12 of wall 11 a distance away from the end wall of the closure 21. Stepped portion 15A of disc-shaped support 15 is thus substantially similar to shape and diameter to the central portion 22D of the end wall 22C of closure 22 and the two annular volumes 15VC and 22VC thus provide respective guideways for guiding the left and right borders of the flexible magnetic card driven through opening 14 to guide the card in a cylindrical path against the surface 12. When the flexible magnetic card is inserted to its full-insertion position within the housing 11 as defined, for example, by a stop or step 12S in the inside surface 12 of the wall 11, vacuum pressure may be automatically applied through line 13P to the opening 11H in wall 11, thereby drawing the flexible card tightly against the inside surface 12.

Secured within a bore 15B which extends axially through the center of the disc-shaped support 15, is a precision bearing 16 which supports shaft 35 for axial and rotational movement therein. Depending on the design of bearings 16 and 21B, either or both may be employed to the exclusion of the other and the one which is utilized is sufficient to rotationally and axially support shaft 35 during its longitudinal and rotational movement through the interior volume 11V of housing 11. Also shown supported by the disc-shaped support 15 are a plurality of motors, two of which denoted 52 and 52A are shown and are operable to power rotate respective drive wheels 54 and 54A secured to the ends of the motor shaft and positioned thereby to frictionally engage the inside surface of a flexible record card which is positioned adjacent the surface 12 of the wall 11 to drive such record card through the housing so as to permit the entire card or a select portion thereof to be adjacent the inside surface 12 and conform thereto per se or when vacuum is applied to the openings 11H. It is also noted that the disc-shaped housing 31 at the end of shaft 35 may be normally disposed at the center of housing 11 and may contain one or more solenoid or fluid cylinder projectable friction elements adapted to engage a record card where it is inserted into the opening 14 and to drive such record card in a cylindrical path adjacent surface 12 until it is fully inserted, thereby eliminating the need for such motors as 52, 52A, etc.

The transducer support assembly 27 includes a hollow cylindrical disc-shaped housing 31 forming an assembly 30 which includes one or more radially movable magnetic transducers, such as magnetic recording and-/or reproduction heads which are respectively movable along radial tracks or guides disposed within or formed in the interior surface of the housing 31. Such magnetic heads are connected to externally located circuits and a source of electrical energy by means of wire supported within one or more cables extending radially through housing 31 to a passageway extending through shaft 35 and are connected to such external source of power and circuitry by means of suitable brush-slip ring commutating means or other signal and energy coupling means. Details of means for supporting, projecting and retracting the magnetic transducers 32A and 32B into and out of engagement with a cylindrically deformed record card disposed within housing 11 are illustrated in FIGS. 4 and 5 and will be described hereafter. Such magnetic heads 32A and 32B are normally retained in a retracted position wherein their operating ends are normally disposed a short distance away from a cylindrically deformed magnetic record card disposed against surface 12 and, when the heads become aligned with a selected track of a cylindrically deformed card within housing 11, they are automatically projected radially against the surface of the magnetic record card or into coupling relation therewith to permit them to effect a circular scan of the selected track. In another form, the disc assembly 30 is continuously rotated while it is moved axially and its transducers effect scanning of selected tracks on-the-fly as they come into alignment with each track.

A number of means and methods may be employed to attain alignment of the magnetic head or heads 32A and 32B with a selected track of a cylindrically deformed record card disposed against surface 12. In one such method, pulses are generated with incremental longitudinal movement of shaft 35 through the housing 11 either by counting marker recordings provided along shaft 35 by photoelectrically or magnetically scanning such recordings or by sensing and detecting marker recordings provided laterally along a record card between or along the parallel tracks thereof. As illustrated in FIG. 1, a magnetic transducer 38 is supported on an elongated mount 39 adjacent disc 31, which mount does not rotate with the rotation of such disc. Magnetic pickup transducer and its mount 39 are kept from rotating by being supported by a collar 37 containing a precision roller bearing which permits shaft 35 to rotate therein without rotating mount 39. A second shaft 19 is secured at its end to mount 39, passes through axial bores 19 and 22B in support 15 and end wall 21 and is adapted to pass through a lineal bushing 52 extending through mount 51. Shaft 34 thus maintains mount 39 circumferentially fixed within the housing 11 as shaft 35 rotates but movable axially with the axial movement of shaft 35 due to the fact that collar 37 supporting shaft 39 is retained by a collar or stepped portion 36 of shaft 35 against the central portion 31A of housing 31. Collar 36 and the central portion 31A preferably engage their central portion of the roller bearing supported within collar or base 37 while the rollers and outer portion of such bearing rotate thereon so as to confine friction to the rolling engagement of the rollers in the bearing race. Notation 18 refers to a bearing disposed within bore 17 for rotationally and axially supporting shaft 35.

As a result of the means for supporting mount 39 against rotation but axially fixed with respect to shaft 35, magnetic pickup 38 may be employed to scan marks or recordings extending along or between the parallel tracks of a magnetic record card as shaft 35 moves axially through the housing with or without rotation of assembly 27 and such scanning results in the generation of pulse signals which may be counted in an electronic counter which, upon uncounting or attaining a predetermined count, may generate a control signal for triggering the initiation of a number of functions including the operation of one or more solenoids advancing the retracted magnetic heads 32A and 32B into engagement or operative relation with respect to the selected track or tracks of a magnetic record card and the energization of said magnetic head or heads with either input information to be recorded on the selected track or a select portion thereof or energizing information to permit the head or heads to reproduce signals previously recorded on the selected track or a selected portion or portions thereof.

In FIG. 3 is shown a modified form of the invention illustrated in FIGS. 1 and 2 wherein a flexible magnetic record card, such as the described floppy, parallel track record card, is fed along the upper surface 55 of a table 54 forming part of a mount 50A for rotationally supporting a cylindrical magnetic recording drum 56 containing an outer card supporting surface 56S. The card is guided downwardly around a curved portion 55C of the upper surface 55 by means of an elongated shaft or pin 56P extending between the end walls of the support 50A to dispose the card in an annular volume 55V between the outer surface 56S of the drum 56 and a cylindrical portion of the support 54 as illustrated. The card continues in its movement, being driven by a plurality of powered rollers 57 and 58 engaging such card against the upper surface 55 of the support 54 and additional rollers, three of which are illustrated and denoted 59A, 59B and 59C, as well as others which engage and drive the card against and around the outer surface 56S of drum 56. When fully deformed to its desired cylindrical or partially cylindrical configuration, the card may be magnetically recorded on and/or reproduced from by means of one or more magnetic transducers 32C, supported on a carriage 60 which is power driven along a track 61 supported at its ends adjacent the drum 56, which transducer is adapted to be normally coupled to the outer surface of the card or to engage or couple to same upon being projected outwardly from the carriage 60 against the selected track of the card. The carriage 60 and the track 61 are shown disposed between powered rollers 59A and 59B with the ends of the track being supported by respective end walls of the support 50A for the drum and table.

As in the embodiment illustrated in FIGS. 1 and 2, suction may also be employed to tightly pull the flexible magnetic card against the outer surface 56S of the drum 56 or the powered rollers may be employed to effect proper alignment and retainment of the flexible card against surface 56S to permit suitable magnetic transducing to be effected while the card is rotated with the drum and the transducer or transducers are properly aligned with a selected circular track of the card.

In FIGS. 4 and 5 is shown details of a modified form of magnetic transducing apparatus for recording on and/or reproducing from selected parallel tracks of a flexible of floppy magnetic card of the type described when the card is arcuately deformed into a partial cylindrical configuration, such as a semi-cylindrical configuration so as to provide semi-cylindrical parallel record tracks capable of being scanned by one or more rotating transducers supported by a disc or drum which is rotated within the semi-cylindrical card configuration. As in the embodiments illustrated in FIGS. 1 and 2, the magnetic transducer or transducers are supported for radial movement from a retracted position to an extended position into engagement or coupling relation with the inside magnetic recording surface of a semi-cylindrically deformed magnetic record card while the card is held against a semi-cylindrical inside surface of an open housing. The transducing apparatus 61 includes a base or support 61S for supporting a mount 90 for a housing 89 containing respective means for power rotating and axially moving a hollow shaft 75 supporting a disc-shaped housing 65 at its end which housing 65 is rotatable within and just off the semi-cylindrical inside surface 62A of a semi-cylindrical housing 62. Housing 62 contains respective end walls, one of which 62B is illustrated in FIG. 4 and supports a bearing 64 within an axial bore 63 adapted to retain shaft 75 for axial movement through the housing 62 and axial rotation therein.

Supported adjacent the disc-shaped housing 65 is an elongated mount 80 or a magnetic reproduction transducer 81 which is employed to scan marker recordings extending across the parallel tracks of a magnetic record card, either along each track or between each track, so as to permit the selective scanning of a selected track by generating pulse signals which are applied to an electronic predetermining counter which, upon uncounting, indicates that the adjacent magnetic transducers are in alignment with the selected track.

A precision bearing, such as a needle or roller bearing 79 supports mount 80 on shaft 75 in a manner to permit rotation of such shaft therein without rotating mount 80 which is prevented from rotation by means of an axially movable shaft 82 which is supported for axial movement by means of a lineal bearing 86 supported by the end wall 62B of housing 62. Notation 77 refers to a cable extending through the hollow inside passageway 76 of shaft 77 from a source of electrical energy and information signals to the transducer or transducer 70T supported by the disc-shaped housing 65. Such transducer or transducers may be projected outwardly from the cylindrical peripheral surface 66 of housing 65 to engage or couple to a selected track of the semi-cylindrically deformed magnetic card and may be retracted beneath such surface 66 after effecting a transducing operation so as to prevent its engagement with the surface of the magnetic record card when not transducing. As in the embodiment of FIGS. 1 and 2, shaft 82 is also hollow and contains flexible cable or wires extending from the transducer 81 to a suitable amplifying, pulse shaping and electronic counting means.

Magnetic pickup 81 may be fixedly supported on its support 80 or projectable therefrom into engagement with the surface of a magnetic card during its axial movement across the card to permit it to pick up marker signals for selectively identifying selected tracks of a card.

Further details of the transducer and card driving means are illustrated in FIG. 5. The peripheral wall 67 of the housing 65 contains a plurality of radial openings 69 through which openings respective magnetic transducers may be driven beyond the outer surface 66 into engagement with a semi-cylindrically deformed record card disposed against the semi-cylindrical surface 62A, a function which may be effected by mechanical or suction means of the type described. The housing 62 is shown as having a semi-cylindrical passageway 62B defining a header to which header may be applied vacuum pressure as described for applying suction to the inside surface of a magnetic record card which is drawn against the semi-cylindrical surface 62A when a drive wheel or drum 87 engages the card against the upper surface 62S of an inlet table or support forming part of the support for the housing 62. It is also noted that disc or drum 65 may also contain projectable friction means for engaging a flexible card which is driven into the annular volume 62V between the outer surface 66 of the peripheral wall of the disc-shaped housing 65 and the semi-cylindrical surface 62A of the housing 62. By driving disc-shaped housing 65 to the center of the semi-cylindrical housing 62 and causing its projectable engaging means [not shown] to engage the inside surface of the front end of a card inserted into volume 62V, and thereafter power rotating housing 65 in a proper direction, such means may be employed to drive the flexible or floppy magnetic card through the volume 62V until its front end or edge engages a stop 62T supported closely adjacent the surface 66 by either or both of the end walls of the housing 62.

As illustrated in FIG. 5, each transducer 70 is supported for radial movement through an opening 69 in the peripheral wall 67 of housing 65 and extends from a transducer base 82 which is supported within a cylindrical housing 84 which also supports a push-pull solenoid or powered lineal motor 83 connected to the transducer base 82 for projecting and retracting the transducer into and out of engagement with a semi-cylindrically deformed magnetic record card disposed against the semi-cylindrical surface 62A. The end of housing 84 is supported by means of a central inner cylindrical wall assembly 76 secured to the end of shaft 75. Notation 85 refers to a cable containing wires extending to power operate the solenoid or lineal motor 83 and to provide electrical energy for powering and properly operating the transducer 70.

Other features of the invention are noted as follows:

1. The support for the record card having a cylindrical or partial cylindrical inside surface, may be modified in external shape and may be configured and operable to rotate about a stationary support for one or more magnetic transducer of the type described which remain stationary as supported or are operable to be advanced by means of a solenoid or motor to engage the circularly deformed record card from a retracted position so as to effect a transducing operation with respect to a selected track of the card when engaging same and properly energized.

2. In place of the described magnetic transducing head or heads, one or more lasers may be operable to effect a reading or writing transducing function with respect to one or more tracks of a record card by replacement of the magnetic transducers with one or more lasers and, in the reproduction mode, providing one or more photoelectric detectors of the reflected laser light after it has intersected recordings which are electro-optically scannable and are provided along a selected track or tracks of the cylindrically deformed record card.

3. The drive means for the shaft 35 [FIGS. 1 and 2] and 75 [FIGS. 4 and 5] may comprise a respective rotary motor for rotating such shaft and the transducer assembly supported at its end and a lineal motor for moving the shaft and transducer assembly in a manner to cause the transducer or transducers of the latter to be driven into alignment with a selected track or tracks of a cylindrically deformed card disposed about the cylindrical support.

4. In another mode of operation, a magnetic record card containing recordings provided along a plurality of parallel record tracks, may be driven against a magnetic recording drum and suitable energy applied across the interface during the driving movement of the card and drum, to effect a transfer or print of the magnetic recordings of the card against the magnetic recording area of the drum. Thereafter, the magnetic recordings provided on parallel tracks of the drum may be selectively scanned and reproduced by means of one or more magnetic pickups supported by a carriage which is operable to travel a track extending parallel to the longitudinal surface or elemental surface of the magnetic recording drum. Selectively disposing the magnetic recording head or heads with one or more selected tracks of the drum may be effected by scanning marker recordings provided along a marker recording track of the drum at one end of the parallel record tracks thereof or normal to the parallel record tracks wherein such recordings are disposed between the record tracks along the length of the drum.

The magnetic recording and reproduction apparatus described and illustrated in FIGS. 1 to 5 is capable of recording analog and/or digital record signals, such as full frame video picture signals in analog or digital form or other forms of data along the parallel tracks of a flexible magnetic sheet or card as relative movement is effected between the rotating head or heads and a semi-cylindrically deformed card as described. Using conventional recording techniques, a magnetic sheet or card of rectangular configuration which is 8" × 10" may be employed to record data at a density of approximately fifty megabytes of data on either both sides of half of such sheet which is pulled out of a flat box-shaped container therefore and is automatically deformed to the described semi-cylindrical configuration, or on a single side of such sheet if the sheet is half-removed from selected of two ends of such a container. By providing the record card or sheet container constructed and operable to permit the card to be removed from either end thereof, depending on which end thereof is inserted into the recepticle of the reader-recorder unit, it is possible to record data on both sides of most of the sheet and as much as one-hundred megabytes of data may be so recorded.

To further increase the recording density, means are provided in FIGS. 6 to 8 for effecting two or more information or data recordings along the same length of a magnetic record track of a record card or sheet of the type described using apparatus of the type described and illustrated in FIGS. 1 to 5, but modified to permit the recording and/or reproduction head or heads or the operating ends thereof to be power pivotted or rotated between two or more recording and/or reproduction positions, at each of which angular positions the recording head may record information in digital or analog form by providing respective magnetic domains which are substantially similarly angled for each recording but which are differently angled with respect to the longitudinal axis or direction of the record track than other data recordings, such as other frames of data or other video signals recorded along the same length of the same track. By similarly pivotting and aligning the magnetic transducer utilized to reproduce from the magnetic recording track containing such multiple recordings each defined by respective magnetic domains aligned along the track in the same direction, such reproduction transducer will sense only one of such multiple recordings with which it is so aligned as it will only sense similarly aligned or angulated domains defining the selected magnetic recording to the exclusion of the domains of one or more other recordings extending along the same length of track. Such technique may be utilized to provide a means for substantially increasing the total amount of data which may be recorded on a single magnetic card or, for that matter on other forms of magnetic recording media, such as magnetic tapes, rigid and flexible discs, magnetic drums and the like.

FIG. 6 shows a disc shaped support and assembly 65' which is similar in structure and operation to the housing 65 of FIGS. 4 and 5 but modified in that one or more magnetic transducer supported thereby which transducer or transducers are both projectable in a radial direction from the peripheral surface 67' thereof to engage or be disposed in close operable relationship with the magnetic record card, as hereinbefore described, and which transducer or transducers are also pivotally rotatable about a radial axis so as to permit either or both the magnetic recording and reproduction of two or more discrete recordings of data along the same length of the same record track wherein each recording is defined by magnetic domains which are similarly angled with respect to the longitudinal axis of the track and are so differently angled to the one or more other recordings extending along the same track length, as to permit the selective reproduction of each recording to the exclusion of and without interference from the other recordings.

In FIG. 6, a cylindrical bore 66P is provided in the body of the disc shaped housing 65', which bore extends to the peripheral surface 66' of the peripheral wall 67' of the housing. Force fitted within such bore is an elongated cylindrical housing 91A of an assembly 91 which includes a magnetic transducer 91T and a plurality of actuators or motors for axial and pivotally driving such transducer. The transducer 91T may comprise either or both of a magnetic recording and reproduction head depending on the manner in which its induction coil or coils are wired or extend. The operating end 91TT of the magnetic transducer 91T consists of a conventional pole piece assembly which has been pivoted counter-clockwise, as viewed, and is shown angled 45 degrees to a plane passing through the central axis of the transducer and the center of the circular record track of the record member being scanned. In FIG. 7, the transducer 91T is shown rotated and positioned at right angles to the position shown in FIG. 6 or 45 degrees to the other side of the described plane allowing it to record or reproduce information defined by magnetic domains which extend at right angles to the direction of the domains defined by the recordings effected by the transducer when in the position shown in FIG. 6.

FIG. 8 shows details of the transducer 91T and its positioning means which comprise a miniature push-pull solenoid or lineal actuator 91F and a rotary solenoid 91H. The solenoid 91F is secured or force fitted in a first bore 91B of elongated cylindrical housing 91A. The stepped cylindrical wall of the solenoid housing conforms to the surface 91BS of the bore 91B while the lower portion of the side wall of such lineal solenoid conforms to the wall 91CS of a reduced diameter extension 91C of the bore. A rotary solenoid or stepping motor 91H is secured to the output shaft 91G of the solenoid 91F and its housing is sliably engaged with the cylindrical bore 91CS to permit it to move longitudinally therethrough on shaft 91G. The magnetic transducer or head 91T is secured to the power rotated output shaft 91J of the rotary solenoid or motor 91H and extends through an opening 91E in the end wall 91D of the elongated housing 91A. Shaft 91J of solenoid 91F is preferably assembled and constructed to prevent its rotation so that the only rotation which can be imparted to the transducer 71T is that caused by the rotation of the output shaft of rotary solenoid 91H.

Notation 91K refers to a slack-flexible conducting cable extending from the operating element or coil(s) of the transducer 91T. Notation 91L refers to a second flexible cable containing the wires of cable 91K plus wires connected to the energizing input of the rotary solenoid 91H and extending therebetween and the housing for the lineal solenoid 91F. A third electrical cable 91M extends from the solenoid 91F to suitable commutating means located near the center of the disc shaped housing 65' and contains all of the above described wires plus wires connected to the energizing input to solenoid 91F.

The transducer-support and actuator assembly 91 may be modified depending on transducing and scanning requirements. For example, the entire assembly 91 or the head 91T may be supported to permit the head to float or to be retained 0.0002" or so away from the record member by the Bernouli effect, thus precluding the need for a lineal actuator of the type described. Air may also be forced from the interior of the housing 91A through a spacing between the transducer 71T and the opening 91E in the end wall 91D to provide such a gap between the end 91TT of the transducer and the flexible or rigid record member. The actuator 91F may also be air operated with air pressurized by a pump or fan connected to the interior volume of housing 91A.

The transducer assembly 91 or modifications thereof may also be employed to support and selectively pivot or rotate a single transducer or a bank of transducers with respect to a flexible or rigid magnetic disc, tape, drum or otherwise shaped magnetic record member. In FIGS. 9 and 10 is shown such as assembly, denoted 99, secured to the end of an elongated arm 100 employed to radially position the transducer in alignment with a select track of a plurality of circular record tracks of a rigid or flexible magnetic disc 94 which is driven in rotation on a rotary support 93 forming part of a disc recording-playback unit 92. Conventional means are provided for supporting and driving the arm 99A radially or otherwise across the rotating disc 94 and include a longitudinal guide or bearing 96 in a housing 95 which also supports a reversible gearmotor 98 and an output drive means, such as a flexible chain connected to a conventional mechanism for effecting the rapid reverse drive of the arm across the rotating magnetic disc 94. Assembly 91 is supported in housing 99 and is supported in housing 99 and positions the end of the magnetic transducer 91T or a plurality of transducers immediately above, floating off or in engagement with the upper surface of the magnetic disc 94 to permit it to selectively transduce different recordings form the same length of select circular record tracks as described above by the selected rotation of the transducer between two or more rotational positions.

The above described lineal and/or rotational driving movements and selective positioning of the transducer as well as the other operations of the described magnetic transducing apparatus are preferably all under the control of a computer or microprocessor to effect the selective recording and/or playback of data with respect to the magnetic recording member.

In FIG. 11 is shown a portion of a magnetic head 100 composed of one or more arrays of magnetic transducers supported by a substrate 100S, which is supported adjacent a magnetic record member, such as described above or otherwise for recording on and/or reproducing record signals from a magnetic record card, tape or disc. Two magnetic heads 101 and 106 are shown with their magnetic pole pieces 102,104 and 107,109 aligned and at right angles to the pole pieces of the other. Notations 103,108, 108 and 110 refer to tapered portions of respective of the pole pieces 102, 104,107 and 109, the ends of which define the respective transducing gaps of the heads 101 and 106. Both heads thus share a common gap area or volume across which respective magnetic fields or flux lines are generated at right angles to each other to provide respective arrays of magnetic domains in the same recording track of the magnetic record member scanned by the head 100, each of which arrays contain domains which are angled or azimuthed at a right angle to the longitudinal axis of the other domains formed by the magnetic field of the other head. The magnetic transdcuers 101 and 106 may be formed by so-called thin film fabrication techniques of Permalloy magnetiostrictive materials, such as vapor deposited iron manganese or nickle iron alloys, as described in the March 1982 and the March 1984 issues of the Journal of Applied Physics and may be but one pair of a plurality of closely spaced pairs of similarly constructed assemblies of magnetic transducers or transducers which are constructed as described hereafter or above. Each of the transducers 101 and 106 may be simultaneously and/or sequentially energized with respective streams of digital data for simultaneous or sequential recording of different data or messages along the same and/or different portions of the same magnetic record track.

FIG. 12 illustrates a modified form of the magnetic transducing assemblies of FIG. 11 showing two magnetic transducers 113 and 116 formed on a common substrate as described, closely adjacent to each other and operable to record respective signals or data along the same record track, the longitudinal axis of which is denoted CST. One transducer 113 is formed of aligned magnetic pole pieces 112 and 114 having a magnetic recording and/or reproduction transducing gap 115 therebetween. Such transducer is angled on its support to provide the longitudinal axis or azimuth of the gap 115 at an acute angle which is clockwise of the track axis CST while the other transducer 116 is disposed on the same support or head substrate with its pole pieces 117A and 117B separated by a transducing gap with its axis at an acute counterclockwise angle to the longitudinal axis CST of the same track. The magnetic domains thus aligned or formed along the same record track by respective pulses of magnetic field energy across the two gaps are thus at respective azimuths or angles which are such that they may be separately reproduced from the same length of record track by respective magnetic reproduction transducers angled as in FIG. 12. As in FIG. 11, a plurality of additional pairs of similarly disposed transducers for recording on and/or reproducing from the same lengths of the same record track of a magnetic record member may be be provided on a common support or substrate to provide a bank or banks of such transducers which may be used with the apparatus described above or modifications thereof.

In FIG. 14 is shown a transducer arrangement composed of two transducers 124 and 128 which are supported on a common substrate as described. Transducer 124 has pole pieces 125,126 separated by a gap 127 for recording and/or reproducing signals in the form of domains in the magnetic recording material of a selected track ST of a magnetic record member as described, which magnetic domains are formed at an azimuth angle or are angulated at an acute angle which is clockwise of the centerline CST of the selected record track. Transducer 128 has the centerline of its gap 131 offset from the centerline of the gap 127 of transducer 124, a degree less than the width of a record track and is angulated at an acute angle which is counterclockwise to the longitudinal axis CST of the selected magnetic record track. The two transducers may thus be employed to provide respective arrays of magnetic domains, certain or all of which partly overlay, as shown in FIG. 17. The substrate or support containing the transducers 124 and 128 may contain a plurality of such pairs of offset or staggered transducers in side-by-side, closely spaced arrays and/or additional transducers of the same array which are additionally offset and differently angled with respect to the longitudinal recording axis of a track or closely spaced parallel tracks of a magnetic record member.

FIG. 15 shows an array of seven transducers denoted 131,133,135,137,139,141 and 143, closely supported on a common head or substrate and having respective signal recording and/or reproduction gaps denoted 132,134,136,138,140,142 and 144 which are longitudinally aligned to record along a common magnetic record track. However, each of the sevent transducers and its gap are angulated differently from the others to provide respectively angulated arrays of magnetic domains along the same length of a record track, each of which arrays may be separately detected by a magnetic pickup having a respectively aligned magnetic field gap. As in FIG. 14, two or more of the multiple transducers of FIG. 15 may be offset from the others to provide respective arrays of magnetic domains, as recordings, which partially overlap.

In FIG. 16 is shown two separate recordings along the same length of a single magnetic track of a magnetic record member formed by the transducing arrangements of FIGS. 11 or 12 or of those of FIGS. 13 and 15 when two of the recording transducers thereof are separately energized with pulse recording information such as digital recording signals. The record member 145 has a record track ST, the centerline CST of which is aligned with the recording axis of a plurality of magnetic magnetic transducers, such as 113 and 116 which respectively receive and are energized with respective streams of digital data or pulses defining respective recordings to be made. Gaps 115 or 144 may be employed, for example, to record a plurality of domains 146 extending at one angle to axis CST after gaps 117A or 132 have recorded a plurality of spaced-apart domains 147 which define a recording different from the recording defined by the overlapping domains 146. Depending on the timing and nature of the digital code recordings provided by each transducer, not all of the domains will overlap, as illustrated. Some domains will be completely spaced apart, as shown, while other will overlap different degrees, but no two overlapping domains will completely cover or mask the other, thus permitting each domain to be detected or sensed by a properly aligned pickup or reproduction head, In FIG. 17 a record track ST of a record member 145 is shown containing two arrays of domains 148 and 149, the latter being first recorded along the left side portion of the track after which the array of domains 148 are recorded along the right side portion of the same track such as by staggered transducers arranged as illustrated in FIG. 14. Here again, the degree of overlapping will depend on the timing and nature of the digital or code signals of each recording or message applied to the respective transducers and certain of the domains will be free of overlapping when recorded while the transducer for recording the differently angled adjacent domain array is not energized. The recording arrangement shown in FIG. 17 may be modified to provide additional arrays of adjacent domains at angles which are different than those shown. Left and right side domains arrays may also be formed of domains which are parallel and/or laterally aligned for detection by respectively staggered pickups with suitably directed detection magnetic field gaps.

In FIG. 18 is shown a pulse recording at a single recording location. The recording is composed of either four domains 150,151,152,152 or eight domains, the longitudinal axes of which extend through a point or common recording area of a select record track ST of a magnetic record member 145. Each of the differently angulated domains may be recorded by a respective of a plurality of differently angulated transducer, such as illustrated in FIG. 15 or by a single pivotable transducer of the type shown in FIG. 8 during consecutive sscanning sweeps of the track ST while the transducer thereof is driven to a different recording angle by a selectively operated stepping motor or solenoid, as described.

FIG. 19 illustrates yet another arrangement of magnetic transducers on a common substrate for providing plural magnetic recordings along the same length of magnetic record track with one or both recordings formed of magnetic domains which overlap the domains or recordings of the other. Two magnetic transducers 155 and 159 are shown, each composed of respective pairs of pole pieces 156,157 and 160,161 which are aligned with each other and extend parallel to the aligned pole pieces of the other. However, the gaps 158 and 162 of the respective heads are angulated with respect to each other and are aligned so as to provide respective magnetic recordings which extend along the same track and may overlap but are separately detectable by respective pick-ups or sensors of the same or different heads.

FIG. 20 shows a magnetic recording transducers 163 and a magnetic reproduction transducer or pick-up 167 respectively formed of polepieces 156,157 and 168,169 supported on a common substrate or head, as described, and extending substantially parallel and close to each other in the manner such that the recording gap 166 of the recording transducer 163 extends in the same direction as the sensing or pick-up gap 170 of the reproduction transducer 167. In other words, both gaps are similarly angulated with respect to the longitudinal axis of a common record track of a magnetic record member when the record member and the head or substrate supporting the two transducers are properly aligned for scanning by either or both said transducers during a recording and/or reproduction operation. The width of the recording gap 166 is shown as less than the width of the reproduction gap 170 in accordance with known design practice and requirements for effecting suitable magnetic recording along narrow record tracks of magnetic recording members such as tape, discs and cards.

A plurality of closely spaced pairs of magnetic recording and reproduction transducers may be provided aligned or offset as illustrated in FIGS. 1-5,6-8,9,10 and 11-15 in substitution for each or a select number of the single magnetic transducers illustrated.

In a particular method of recording and reproducing digital data in the form of streams of digital codes, such as binary codes and the like along a selected track or tracks of a magnetic record member, a single message or stream of such digital data may be simultaneously applied to two recording transducers the recording gaps of which are longitudinally aligned with the recording track by differently angulated, as in FIG. 12 to permit the simultaneous recording of the same data along the same track and in the form of respective arragys of domains which are respectively angulated and overlap as in FIGS. 16 to 18 so as to permit the recordings of each array to be simultaneously reproduced am compared in an electronic comparator to provide a parity check or system for automatically ascertaining if digital data is properly recorded wherein the need for extra recording tracks is eliminated as the two arrays of recordings are recorded along the same length or lengths of the same track and selectively reproduced therefrom as described.

What is claimed is:

1. Magnetic recording apparatus comprising:
   (a) a first support,
   (b) first means supported by said first support for supporting a magnetic record member,
   (c) second means supported by said first support including a recording magnetic transducer having aligned pole pieces and operable to magnetically transduce data with respect to said magnetic record member supported by said first support,
   (d) means for effecting relative scanning movement between said first and second means to permit said transducer to transduce information with respect to a select record track of said magnetic record member, the improvement comprising:
   (e) means for controllably moving said transducer in a manner to selectively change the attitude of its pole pieces to permit it to record data defining at least two discrete magnetic recordings along the same length of the same record track of said magnetic record member, wherein a first of said magnetic recordings is defined by magnetic domains which extend in a first direction in the recording material of a select record track of said magnetic record member and another of said magnetic recordings is defined by magnetic domains which extend in a second direction in the magnetic recording material of the same record track of said record member but at an angle to the longitudinal axis of said track which is different from the angle defined by the first direction in which said domains of said first and said magnetic recordings extend.

2. Magnetic recording apparatus in accordance with claim 1 wherein said means for controllably moving said magnetic transducer comprises means for controllably rotating same about an axis passing through the record track of said magnetic record member when said transducer is operatively aligned with said record member and said record track.

3. Magnetic recording apparatus in accordance with claim 2 wherein said means for controllably rotating said magnetic transducer includes an electrically operated motor means.

4. Magnetic recording apparatus in accordance with claim 3 wherein said electrically operated motor means comprises a bistable solenoid.

5. Magnetic recording apparatus in accordance with claim 1 wherein said means for effecting relative scanning movement between said first and second means comprises means for power rotating one of said first and second means with respect to the other while said recording transducer is in operable alignment with a select track of said magnetic record member and while the pole pieces of said recording magnetic transducer are operatively aligned in a select direction with respect to said magnetic record member.

6. Magnetic recording apparatus in accordance with claim 5 including magnetic signal reproduction means forming part of said second means and operable to selectively reproduce the magnetic recordings may by said recording transducer when aligned in one of said first and second directions to the exclusion of the recordings made thereby when aligned in the other of said directions.

7. Magnetic transducing apparatus comprising:
   (a) a first support,
   (b) first means supported by said first support for predeterminately supporting and positioning a magnetic record member,
   (c) second means supported by said support for magnetically recording digital information signals with respect to a select record track of a magnetic record member supported by said first means,
   (d) said magnetic recording means comprising first and second magnetic recording transducer, each having respective magnetic pole means and a recording gap across which respective pulsed magnetic fields may be generated for effecting respective magnetic recordings in a select track of a magnetic record member adjacent thereto in the form of magnetic domains which are predeterminately aligned by the magnetic fields applied across said gaps.
   (e) said first magnetic recording transducer being aligned and operable to record digital pulse recordings defined by magnetic domains which are aligned in a first direction in the magnetic recording medium of a magnetic record member supported by said first means,
   (f) said second magnetic recording transducer being aligned and operable to record digital pulse recordings defined by magnetic domains which are aligned in a second direction in the magnetic recording medium of said magnetic recording member when supported by said first means wherein said first and second directions are sufficiently angulated with respect to each other to permit the recordings made by said first and second recording transducers to be separately detectable to the exclusion of the other recording when said recordings are generated along a common record track of said magnetic record member.

8. Magnetic transducing apparatus in accordance with claim 7 including a common support for fixedly supporting said first and second magnetic transducers with respect to each other.

9. Magnetic transducing apparatus in accordance with claim 8 wherein said first and second magnetic recording transducers are are aligned on said common support to permit both to simultaneously scan the same record track of a magnetic record member supported and predeterminately positioned on said first support.

10. Magnetic transducing apparatus in accordance with claim 7 wherein said plurality of magnetic transducers are disposed and aligned to share a common pole piece gap for recording.

11. Magnetic transducing apparatus in accordance with claim 7 wherein said first and second magnetic recording transducers have recording gaps which are staggered with respect to the center line of a magnetic record track of a magnetic record member with which said magnetic recording means is operatively aligned.

12. Magnetic transducing apparatus in accordance with claim 7 including first and second magnetic reproduction transducers and a common support supporting all of said transducers, said first reproduction transducer being aligned on said common support to sense magnetic recordings provided on said record member by said first magnetic recording transducer to the exclusion of the recordings made by said second recording transducer, said second reproduction transducer being aligned on said common support and operable to sense and reproduce magnetic recordings made by said second recording transducer to the exclusion of recordings made by said first recording transducer, said first and second recording transducers being operable to simultaneously scan the same record track of a record member which is predeterminately positioned on said first means.

13. A method for magnetically recording information in along a select record track of a magnetic record member comprising
   (a) pivotally supporting a magnetic recording transducer on a mount aligning said transducer in operable relation with respect to a select track of a magnetic record member which is supported adjacent said mount,
   (b) power operating a drive means to cause it to pivot said magnetic recording transducer so as to cause it to assume a first select angular attitude with respect to the longitudinal axis of said select track of said magnetic record member,
   (c) effecting controlled relative scanning movement between said record member and said transducer while controllably energizing said transducer with first digital information signals to cause said transducer to record first digital information along a select portion of said select track of said record member,
   (d) thereafter power operating said drive means to cause it to pivot said magnetic recording transducer to cause it to assume a second angular attitude with respect to the longitudinal axis of said select track of said magnetic record member, and
   (e) effecting controlled relative scanning movement between said record member and said transducer while energizing said transducer with second digital information signals to cause said transducer to record second digital information along a select portion of said select track of said record member.

14. A method in accordance with claim 13 wherein the controlled relative scanning movements between said transducer and said record while said transducer is energized with both said first and second digital information signals, occur while said transducer is operatively scanning the same portion of said select record track of said magnetic record member and wherein said first digital signal recordings are defined by first magnetic domains which are selectively aligned in the magnetic recording material of said record member in a first direction and said second digital recordings are defined by second magnetic domains which are aligned in the magnetic recording material of said select track in a second direction and wherein said first and second directions are sufficiently angulated with respect to each other to permit each of said first and second digital recordings to be selectively detected and reproduced from said record member to the exclusion of the other.

15. A method for magnetically recording digital information on magnetic recording members comprising:
   (a) providing a plurality of magnetic recording transducers on a common support defining a magnetic head, wherein each of said transducers contains a recording gap for recording digital signal information defined by aligned magnetic domains formed in the magnetic recording material aligned with said gap when the transducer is energized, and wherein the lateral axis of the gap of each transducer is angulated differently than the lateral axis of at least one of the other magnetic recording transducers,
   (b) effecting controlled relative scanning movement between said common support and a magnetic record member disposed in recording relation with respect to said head, in a first direction while a first of said transducers is substantially aligned with a select record track of said record member, and
   (c) while such alignment and scanning movement is effected, applying first digital information signals to energize a first of said transducers to cause same to effect a first digital signal recording along a select length of said record track of said record member wherein said first digital signal recording is defined by a first array of first magnetic domains in the recording material of said magnetic record member which first domains are all substantially similarly angulated with respect to the longitudinal axis of said track of said magnetic record member, and
   (d) generating and applying second digital information signals to energize a second of said recording transducers while relative scanning movement is effected between said second transducer and at least a portion of the same length of said magnetic record track scanned and recorded along by said first transducer and while said second transducer is aligned with said select record track to cause said second transducer to effect a second digital signal recording along such portion of the same length of said record track containing said first recording wherein said second recording is defined by a second array of magnetic domains which are substantially similarly angulated at an angle to the longitudinal axis of said select track of said record member but extend at a sufficiently different angle to direction of the domains of said first digital signal recordings to permit said first and second arrays of magnetic domains to be separately sensed during a reproduction transducing operation to the exclusion of the domains which are not similarly aligned and which extend along the same record track.

16. Magnetic transducing apparatus for recording information on flexible magnetic record cards comprising:
   (a) first means for supporting a flexible magnetic record card in an arcuate formation defining a portion of a cylinder with the inside surface of the arcuately formed card containing magnetic recording material,
   (b) magnetic recording transducing means operable for magnetically recording information with respect to a plurality of record tracks provided in said magnetic recording material of a record card supported by said first means and deformed in the shape of a partial cylinder wherein the parallel record tracks of said card form respective parallel circular track formations which extend around the inside surface of said deformed card,
   (c) second means for rotationally supporting said transducing means within said first means and a magnetic card which is arcuately supported thereon to permit said transducing means to operatively scan the inside recording surface of the card,
   (d) third means for effecting controlled powered rotary movement between said first means and said transducing means,
   (e) fourth means for effecting powered lineal movement between said transducing means and said first means to operatively bring said transducing means into scanning relation with select tracks of said card,
   (f) fifth means for energizing said transducing means with select record signals when said transducing means is operatively scanning a select circular track of said card to cause said transducing means to magnetically record select information along said select card track,
   (g) sixth means including magnetic pick-up means supported by said second means and rotatable with said recording transducing means for selectively reproducing information from selected tracks of a magnetic card arcuately supported by said first means, and
   (h) seventh means for controllably energizing said magnetic pick-up when it is operatively aligned with a select track of a card operatively supported by said first means to cause said magnetic pick-up to transduce magnetic recordings of information recorded on said select track of said card.

17. Magnetic transducing apparatus in accordance with claim 16 including means for effecting controlled rotation of both said magnetic recording transducing means and said magnetic pick-up about their longitudinal axes to respective dispose both at selected different angles with respect to the direction of the semi-circular record tracks scanned thereby to permit said magnetic recording transducing means to effect magnetic recordings defined by magnetic domains which are selectively angled with respect to the longitudinal axis of a record track and to permit said magnetic pick-up to selectively reproduce selected of said recordings defined by domains which are angled in accordance with the angle to which said pick-up is rotated on said second means.

18. Magnetic transducing apparatus in accordance with claim 16 wherein said magnetic recording transducing means comprises first and second transducers supported by said second means for effecting simultaneous scanning movement with respect to the same record tracks of a magnetic card operatively supported by said first means, wherein said first and second transducing means each have a recording gap which is angulated differently from the gap of the other to permit each to effect respective recordings defined by respective arrays of magnetic domains which are respectively differently angulated.

19. Magnetic transducing apparatus in accordance with claim 16 wherein said fifth and seventh means includes means for sensing relative longitudinal movement between a record card supported by said first means and said second means and means connected to said sensing means for generating a control signal when said second means is predeterminately located with respect to said first means and the magnetic recording and pick-up transducers supported thereby are operatively aligned with a select track of a magnetic record card supported by said first means and means for applying said control signal to control either said fifth or seventh means to energize said recording transducing means to effect a select recording along said select track of said card or said pick-up to reproduce signals recorded along said select track of said card.

20. Apparatus in accordance with claim 19 wherein said wherein said means for generating said control signal includes scanning means supported by said second means for scanning track locating recordings on a record card and generating corresponding output signals as said fourth means operates to effect said lineal movement between said first means and said transducing means.

* * * * *